United States Patent
Wang et al.

(10) Patent No.: US 12,375,678 B2
(45) Date of Patent: Jul. 29, 2025

(54) METHODS AND NON-TRANSITORY COMPUTER READABLE STORAGE MEDIUM FOR PRE-ANALYSIS BASED RESAMPLING COMPRESSION FOR MACHINE VISION

(71) Applicant: Alibaba Damo (Hangzhou) Technology Co., Ltd., Zhejiang (CN)

(72) Inventors: Shurun Wang, Beijing (CN); Zhao Wang, Beijing (CN); Yan Ye, San Diego, CA (US); Shiqi Wang, Hong Kong (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 32 days.

(21) Appl. No.: 18/477,920

(22) Filed: Sep. 29, 2023

(65) Prior Publication Data
US 2024/0121395 A1 Apr. 11, 2024

Related U.S. Application Data

(60) Provisional application No. 63/378,891, filed on Oct. 10, 2022.

(51) Int. Cl.
*H04N 19/132* (2014.01)
*H04N 19/119* (2014.01)
(Continued)

(52) U.S. Cl.
CPC ......... *H04N 19/132* (2014.11); *H04N 19/119* (2014.11); *H04N 19/124* (2014.11);
(Continued)

(58) Field of Classification Search
CPC .. H04N 19/132; H04N 19/119; H04N 19/124; H04N 19/136; H04N 19/23; H04N 19/463; H04N 19/85
See application file for complete search history.

(56) References Cited

U.S. PATENT DOCUMENTS

| | | | |
|---|---|---|---|
| 6,591,017 B1 * | 7/2003 | Fukuhara | H04N 19/122 382/302 |
| 2009/0198827 A1 * | 8/2009 | Hughes | H04N 7/17318 709/231 |

(Continued)

FOREIGN PATENT DOCUMENTS

| | | | |
|---|---|---|---|
| CN | 101312529 | * | 5/2007 |
| CN | 113379753 | * | 3/2020 |

(Continued)

OTHER PUBLICATIONS

Li, Song-nan translation CN 113379753 Mar. 10, 2020 (Year: 2020).*

(Continued)

*Primary Examiner* — Zaihan Jiang
(74) *Attorney, Agent, or Firm* — Finnegan, Henderson, Farabow, Garrett & Dunner, LLP

(57) ABSTRACT

An image data encoding method is provided. The image data encoding method includes receiving an input image and a quantization parameter (QP); performing pre-analysis of the input image based on the QP to obtain input image data for machine version; determining at least one of a temporal redundancy or a spatial redundancy of the input image data; determining, based on the at least one of temporal redundancy or spatial redundancy, whether to perform at least one of temporal down-sampling or spatial down-sampling; performing down-sampling of the input image data according to the determination, wherein the down-sampling includes at least one of temporal down-sampling or spatial down-sampling; and encoding the down-sampled image data based on the QP.

20 Claims, 10 Drawing Sheets

(51) Int. Cl.
*H04N 19/124* (2014.01)
*H04N 19/136* (2014.01)
*H04N 19/23* (2014.01)
*H04N 19/463* (2014.01)
*H04N 19/85* (2014.01)

(52) U.S. Cl.
CPC ........... *H04N 19/136* (2014.11); *H04N 19/23* (2014.11); *H04N 19/463* (2014.11); *H04N 19/85* (2014.11)

(56) References Cited

U.S. PATENT DOCUMENTS

| | | | |
|---|---|---|---|
| 2013/0322524 A1 | 12/2013 | Jang et al. | |
| 2014/0010294 A1* | 1/2014 | Ye | H04N 19/157 375/240.12 |
| 2015/0098510 A1* | 4/2015 | Ye | H04N 19/597 375/240.16 |
| 2015/0103886 A1* | 4/2015 | He | H04N 19/70 375/240.02 |
| 2015/0172616 A1* | 6/2015 | Ye | H04N 19/186 348/43 |
| 2015/0326857 A1 | 11/2015 | Zhang et al. | |
| 2016/0330457 A1* | 11/2016 | Ye | H04N 19/96 |
| 2020/0162751 A1 | 5/2020 | Kim et al. | |
| 2021/0067803 A1 | 3/2021 | Li et al. | |
| 2022/0094962 A1* | 3/2022 | Choi | H04N 19/136 |
| 2022/0210402 A1* | 6/2022 | Li | H04N 19/577 |
| 2022/0224900 A1* | 7/2022 | Li | G06N 3/04 |
| 2022/0224924 A1* | 7/2022 | Li | H04N 19/33 |

FOREIGN PATENT DOCUMENTS

| | | | |
|---|---|---|---|
| CN | 113313776 | * | 5/2021 |
| CN | 113852816 | * | 9/2021 |
| CN | 114342371 | A | 4/2022 |
| JP | 2011004343 | A | 1/2011 |
| WO | 2021228513 | A1 | 11/2021 |
| WO | WO-2023240835 | * | 9/2022 |

OTHER PUBLICATIONS

Deng, Xuan translation CN 113313776 May 27, 2021 (Year: 2021).*
Liu, Yu translation CN 113852816 Sep. 28, 2021 (Year: 2021).*
Wang, Ronggang translation WO 2023240835 Sep. 26, 2022 (Year: 2022).*
CN 101312529 translation Peng, Li-zhong May 24, 2007 (Year: 2007).*
Adini et al., "Context-enabled learning in the human visual system," Nature, vol. 415, 2002, pp. 790-793.
Afonso et al., "Video Compression Based on Spatio-Temporal Resolution Adaptation," IEEE Transactions on Circuits and Systems for Video Technology, vol. 29, No. 1, 2019 pp. 275-280.
An et al., "Block partitioning structure for next generation video coding," International Telecommunications Union, 2015, 8 pages.
Balle, et al., "Variational Image Compression with a Scale Hyperprior," International Conference on Learning Representations, 2018, 23 pages.
Balle et al., End-to-End Optimized Image Compression, ICLR, 2017, 27 pages.
Bosch et al., "Segmentation-Based Video Compression Using Texture and Motion Models," IEEE Journal of Selected Topics in Signal Processing, vol. 5, No. 7, 2011, pp. 1366-1377.
Bross et al., Developments in International Video Coding Standardization After AVC, With an Overview of Versatile Video Coding (VVC), Proceedings of the IEEE, vol. 109, No. 9, Sep. 2021, pp. 1463-1493.

Brouard, Olivier, "Pre-analysis of video for its advanced coding. Application to the HDTV coding in H.264 streams," Université de Nantes, 48 pages, 2010.
Chao, et al., "A Novel Rate Control Framework for SIFT/SURF Feature Preservation in H.264/AVC Video Compression," IEEE Transactions on Circuits and Systems for Video Technology, vol. 25, No. 6, Jun. 2015, pp. 958-972.
Duan et al., "Overview of the MPEG-CDVS Standard," IEEE Transactions on Image Processing, vol. 25, No. 1, Jan. 2016, pp. 179-194.
Duan et al., Compact Descriptors for Video Analysis: The Emerging MPEG Standard, IEEE Computer Society, 2018, pp. 44-54.
Duan et al., "Video Coding for Machines: A Paradigm of Collaborative Compression and Intelligent Analytics," IEEE Transactions on Image Processing, vol. 29, 2020, pp. 8680-8695.
Garcia-Lucas et al., "Acceleration of the integer motion estimation in JEM through pre-analysis techniques," J. Supercomput, 75:1203-1214, 2019.
Jiang et al., "An End-to-End Compression Framework Based on Convolutional Neural Networks," IEEE Transactions on Circuits and Systems for Video Technology, vol. 28, No. 10, Oct. 2018, pp. 3007-3018.
Li et al., "A Domain Rate Control Algorithm for High Efficiency Video Coding," IEEE Transactions on Image Processing, vol. 23, No. 9, Sep. 2014, pp. 3841-3854.
Lin et al., "Adaptive Downsampling to Improve Image Compression at Low Bit Rates," IEEE Transactions on Image Processing, vol. 15, No. 9, Sep. 2006, pp. 2513-2521.
Liu et al., "Compressive Sampling-Based Image Coding for Resource-Deficient Visual Communication," IEEE Transactions on Image Processing, vol. 25, No. 6, Jun. 2016, pp. 2844-2855.
Liu et al., "CNN-Basesd DCT-Like Transform for Image Compression," Springer, 2018, pp. 61-72.
Minnen et al., "Joint Autoregressive and Hierarchical Priors for Learned Image Compression," 32nd Conference on Neural Information Processing System, 2018, 10 pages.
Mohan et al., "Internet of Video Things in 2030: A World with Many Cameras," IEEE Xplore, 2017, 4 pages.
Pfaff et al., "CE3: Affine linear weighted intra prediction (CE3-4.1, CE3-4.2)," JVET-N0217, 14$^{th}$ Meeting: Geneva, CH, Mar. 19-27, 2019, 17 pages.
Rabbani et al., "JPEG2000: Image compression fundamentals, standards and practice," Journal of Electronic Imaging, 2002, 11(2): 286.
Sullivan et al., "Overview of the High Efficiency Video Coding (HEVC) Standard," IEE Transactions on Circuits and Systems for Video Technology, vol. 22, No. 12, pp. 1649-1668 (2012).
Toderici et al., "Variable Rate Image Compression with Recurrent Neural Networks," ICLR, 2016, 12 pages.
Wallace et al., "The JPEG Still Picture Compression Standard," IEEE Transactions on Consumer Electronics, vol. 38, No. 1, Feb. 1992, 17 pages.
Wang et al., "Extended Coding Unit Partitioning for Future Video Coding," IEEE Transactions on Image Processing, vol. 29, 2020, pp. 2931-2946.
Wiegand et al., "Overview of the H.264/AVC Video Coding Standard," IEEE Transactions on Circuitds and Systems for Video Technology, vol. 13, No. 7, Jul. 2003, pp. 560-576.
Yokoyama et al., "A Rate Control Method With Pre-Analysis For Real-Time MPEG-2 Video Coding," 2001 International Conference on Image Processing, IEEE, pp. 514-517, 2001.
Yuxin et al., https://github.com/facebookresearch/detectron2. Detectron2, 2019.
Zhao et al., "Mode-dependent non-separable secondary transform," ITU-T SG16/Q6 Doc. COM16-C1044, 5 pages, 2015.
PCT International Search Report and Written Opinion mailed Jan. 18, 2024, issued in corresponding International Application No. PCT/CN2023/123843 (8 pgs.).

* cited by examiner

METHODS AND NON-TRANSITORY COMPUTER READABLE STORAGE MEDIUM FOR PRE-ANALYSIS BASED RESAMPLING COMPRESSION FOR MACHINE VISION

CROSS-REFERENCE TO RELATED APPLICATIONS

The disclosure claims the benefits of priority to U.S. Provisional Application No. 63/378,891, filed on Oct. 10, 2022, which is incorporated herein by reference in its entirety.

TECHNICAL FIELD

The present disclosure generally relates to video processing, and more particularly, to methods and apparatuses for performing pre-analysis based resampling compression for machine vision.

BACKGROUND

With the rise of machine learning technologies and machine vision applications, the amount of videos and images (collectively referred to as "image data") consumed by machines has been rapidly growing. Typical use cases include autonomous driving, intelligent transportation, smart city, intelligent content management, etc., which incorporate machine vision tasks such as object detection, instance segmentation, and object tracking.

Due to the large volume of image data required by machine vision tasks, it is essential to compress the image data for efficient transmission and storage. However, conventional image/video compression techniques have been focusing on ensuring the image/video quality as perceived by humans, yet machines consume and understand visual data differently from humans. As a result, the image/video compression techniques suitable for machine vision could be different from the conventional one. New compression techniques are therefore needed to achieve optimized performance for machine usage.

SUMMARY OF THE DISCLOSURE

The present disclosure provides an exemplary image data encoding method. The image data encoding method includes receiving an input image and a quantization parameter (QP); performing pre-analysis of the input image based on the QP to obtain input image data for machine version; determining at least one of a temporal redundancy or a spatial redundancy of the input image data; determining, based on the at least one of temporal redundancy or spatial redundancy, whether to perform at least one of temporal down-sampling or spatial down-sampling; performing down-sampling of the input image data according to the determination, wherein the down-sampling includes at least one of temporal down-sampling or spatial down-sampling; and encoding the down-sampled image data based on the QP.

In some embodiments, an exemplary image data decoding method includes: receiving a bitstream comprising image data; generating reconstructed image; determining whether to perform at least one of temporal up-sampling or spatial up-sampling of the reconstructed image based on the bitstream; and performing, based on the determination, the at least one of temporal up-sampling or spatial up-sampling to obtain a recovered image.

In some embodiments, a non-transitory computer readable storage medium stores a bitstream generated by operations including receiving an input image and a quantization parameter (QP); performing pre-analysis on the input image based on the QP to obtain input image data for machine version; determining at least one of a temporal redundancy or a spatial redundancy of the input image data; determining, based on the at least one of temporal redundancy or spatial redundancy, whether to perform at least one of temporal down-sampling or spatial down-sampling; performing down-sampling of the input image data according to the determination, wherein the down-sampling includes at least one of temporal down-sampling or spatial down-sampling; and encoding the down-sampled image data based on the QP.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

The present disclosure is directed to "Video Coding for Machines" (VCM), which aims at compressing input videos and images or feature maps for machine vision tasks. Specifically, according to exemplary embodiments, prior to encoding image data, it is pre-analyzed to determine redundancy therein that is not required by or not critical to machine vision tasks. Based on the pre-analysis result, the image data is temporally down-sampled or spatially down-sampled to remove the redundancy. The down-sampled image data is then encoded by an encoder to generate an encoded bitstream, which is provided to a decoder. The decoder decodes the bitstream and reconstructs the down-sampled image data, which can be temporally or spatially up-sampled before being used by the machine vision tasks. In some embodiments, the up-sampling can be skipped and the reconstructed down-sampled image data can be directly used by the machine vision tasks.

Consistent with the disclosed embodiment, the pre-analysis step may be performed by an image data pre-processor separate from the encoder. Alternatively, the pre-analysis may be performed by the encoder itself. The present disclosure does not limit the hardware or software architecture for implementing the image data pre-analysis.

The disclosed techniques are suitable for compressing image data used by any machine vision tasks, such as object recognition and tracking, face recognition, image/video search, mobile augmented reality (MAR), autonomous vehicles, Internet of Things (IoT), images matching, 3-dimension structure construction, stereo correspondence, motion tracking, etc.

Figure 1:
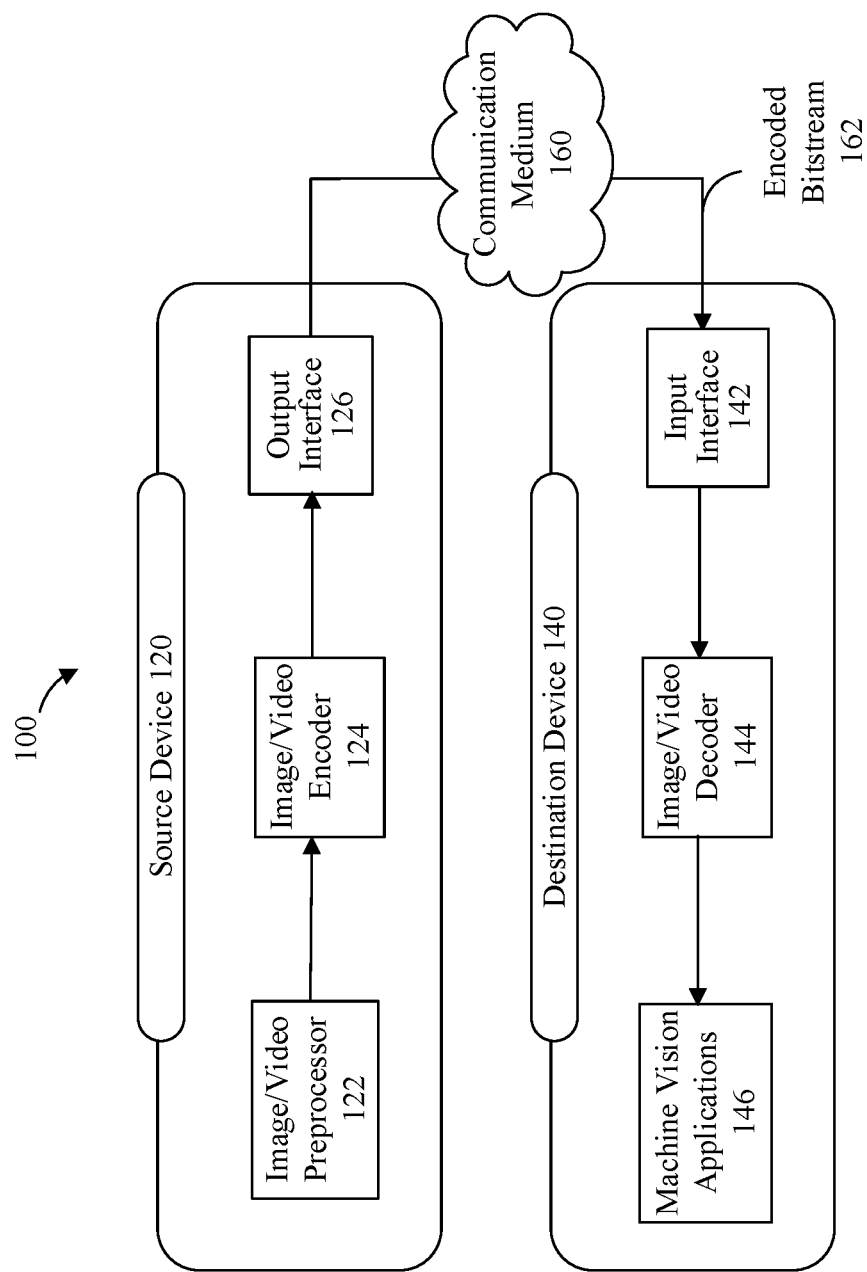
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques (such as those utilized by image/video encoder 124 and image/video decoder 144) are described in connection with FIGS. 2A-2B and FIGS. 3A-3B.

Figure 2A:
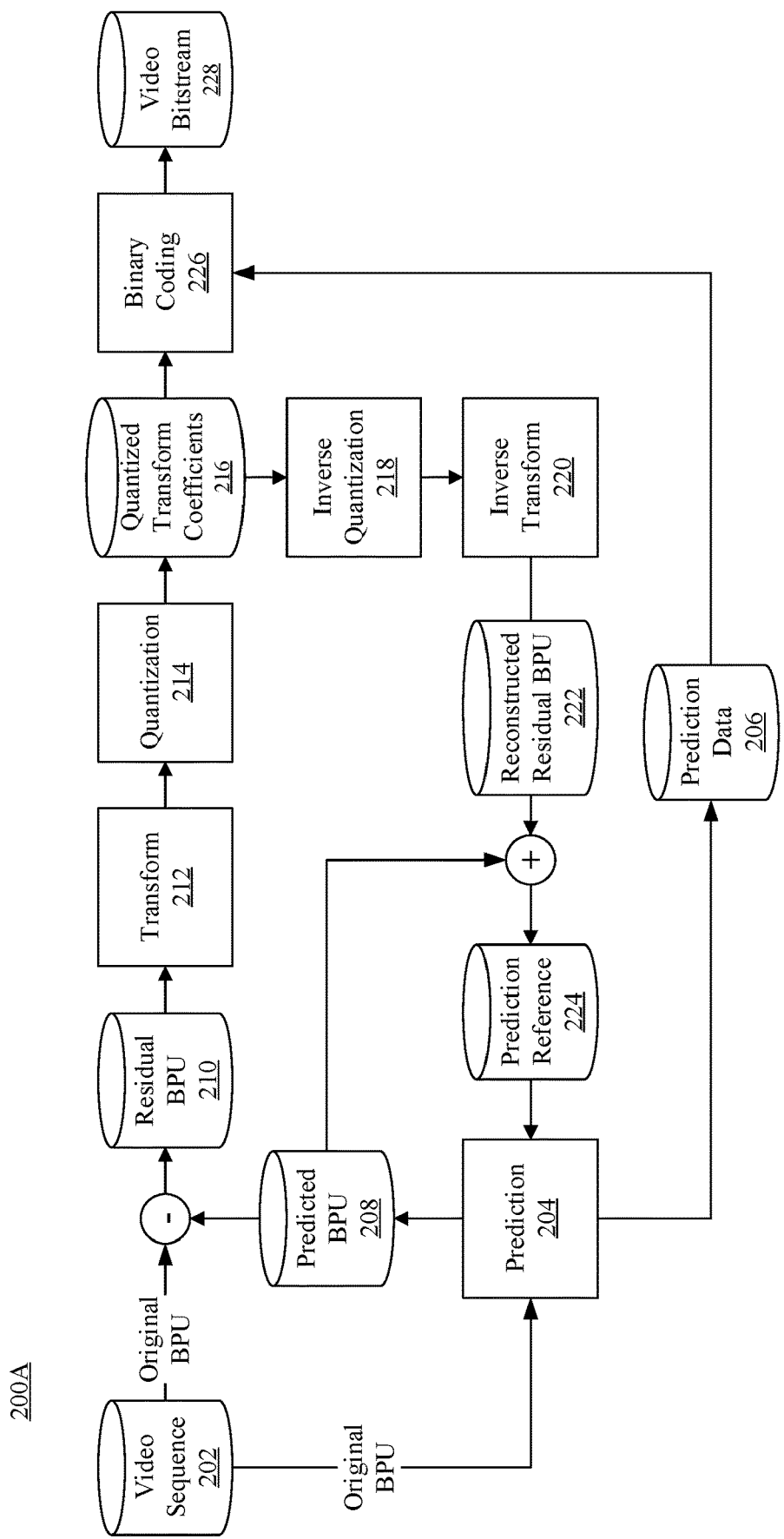
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
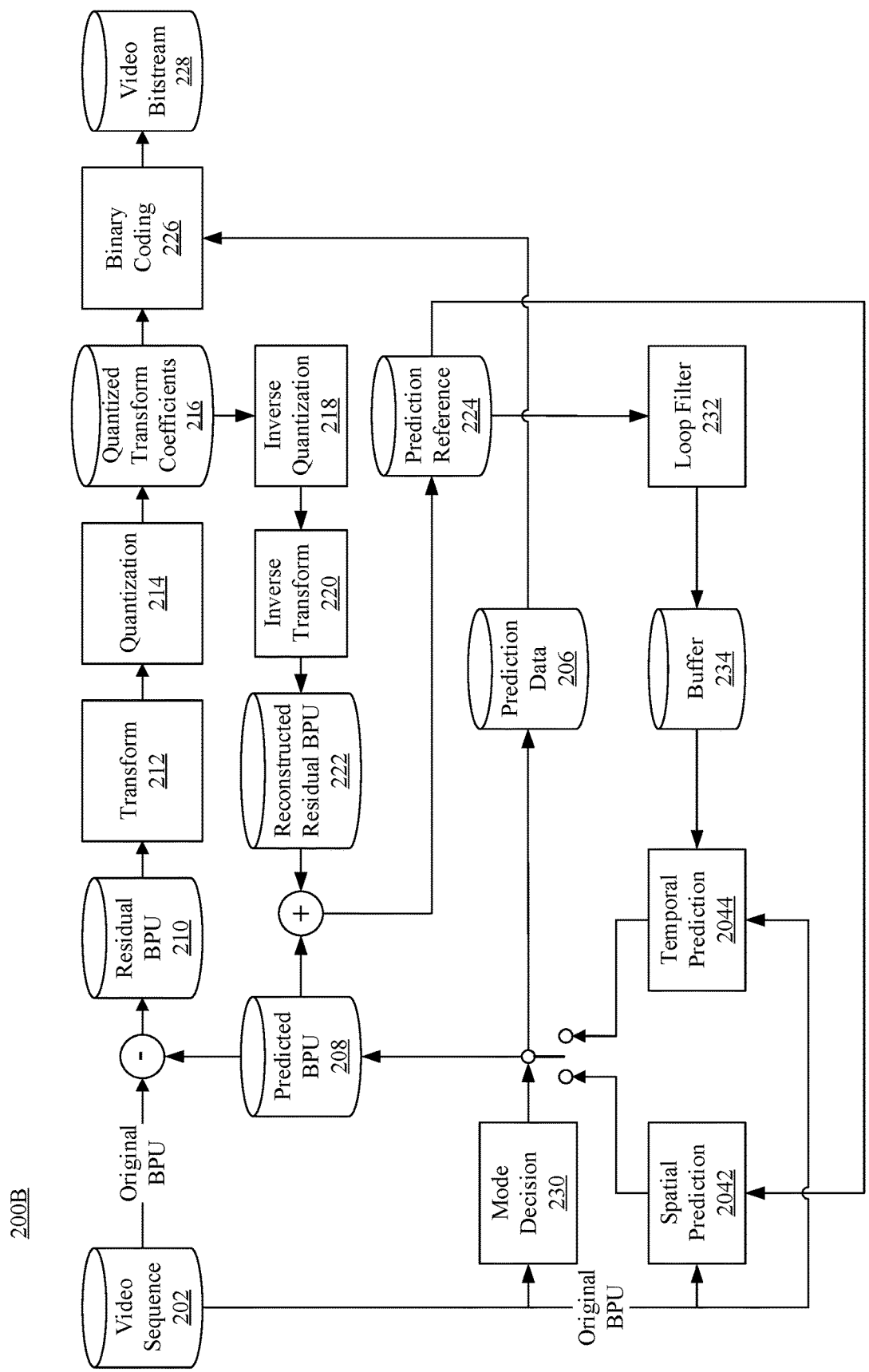
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed image as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
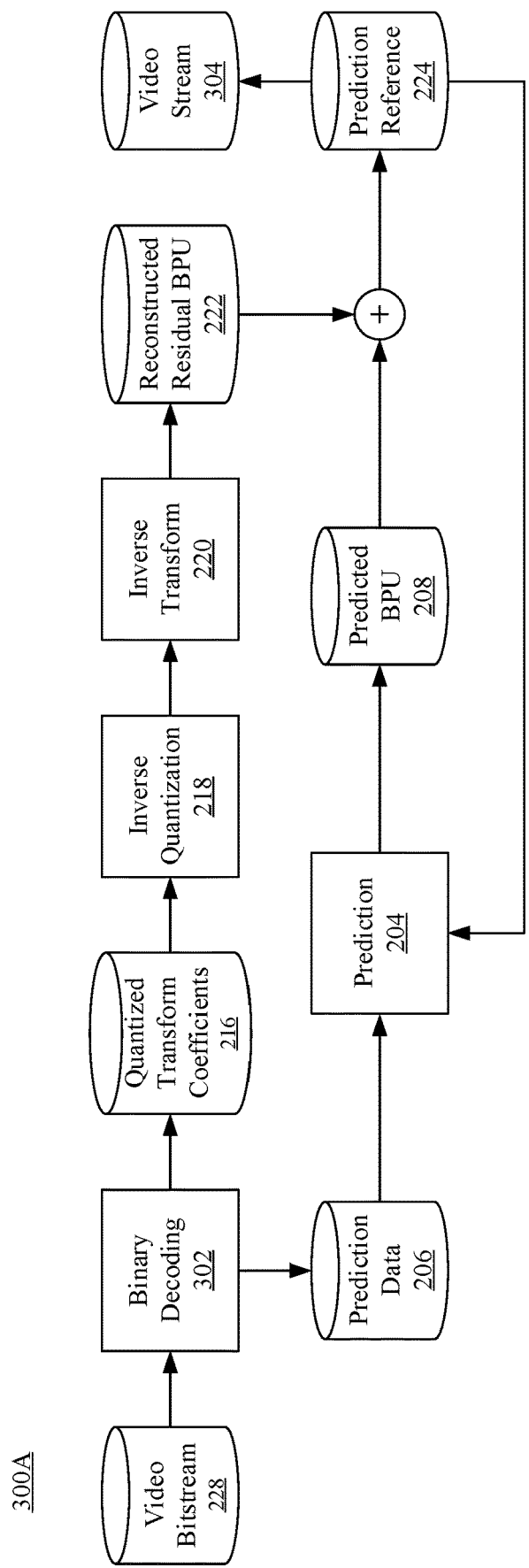
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
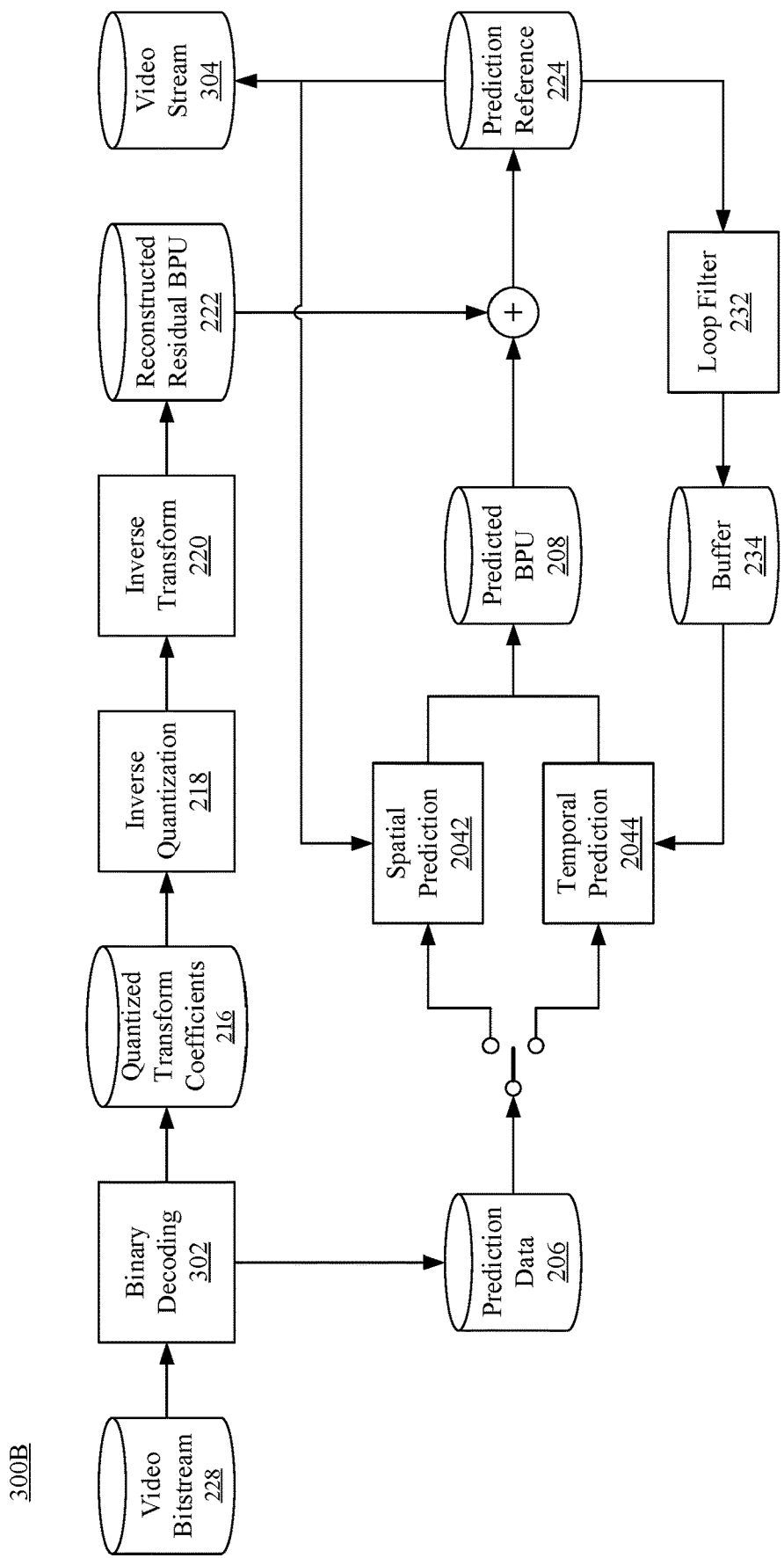
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
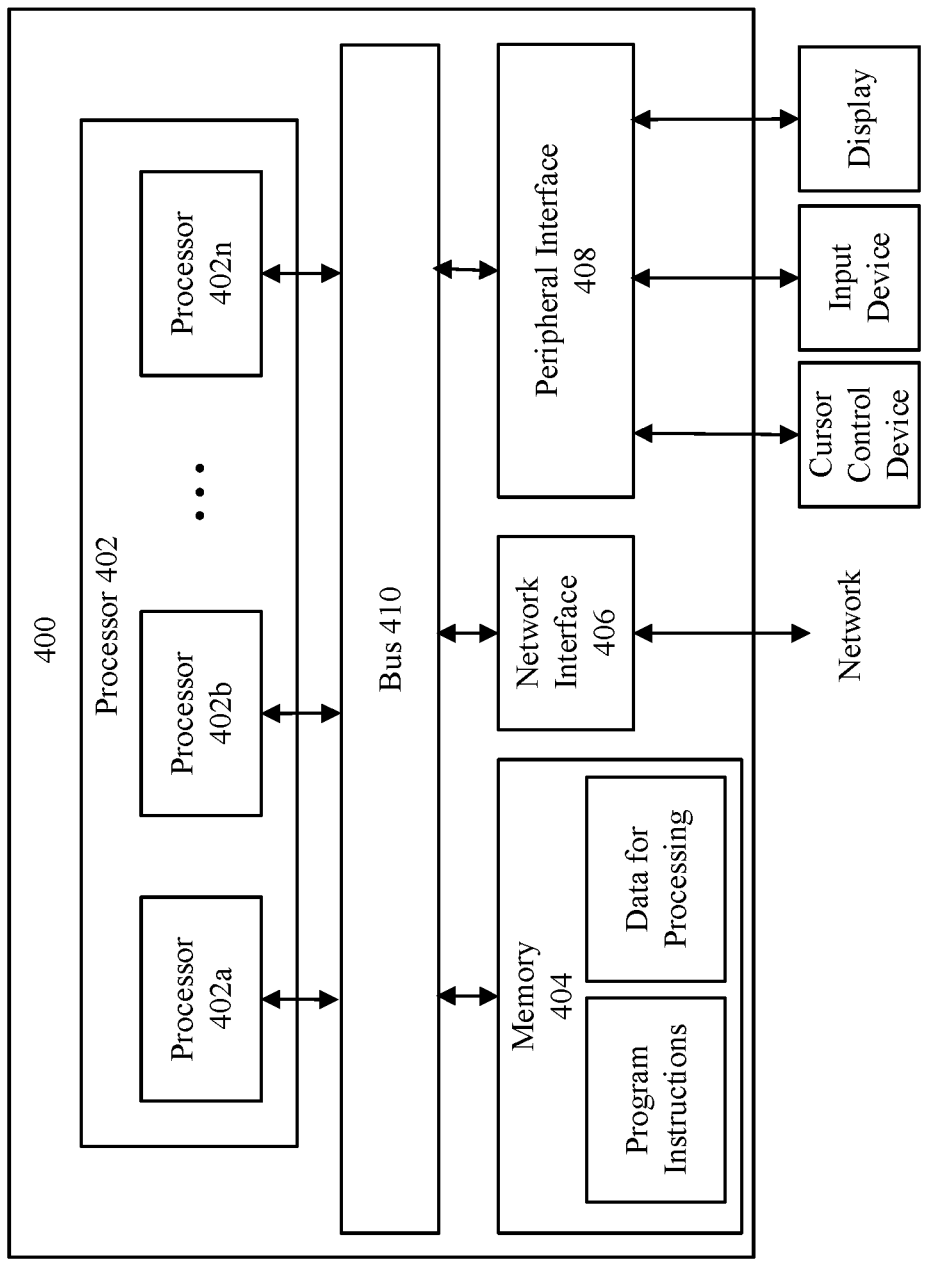
FIG. 4 is a block diagram of an exemplary apparatus for preprocessing or coding image data, according to some embodiments of the present disclosure.

Referring back to FIG. 1, each image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Consistent with the disclosed embodiments, the multimedia acquisition, processing, transmission and application systems developed in recent years have led to an explosive growth of visual data. The compact representation of image/video has been a long-standing problem and plays a crucial role in visual data centered applications. Conventionally, the main focus of image/video compression techniques is the improvement of human vision quality with less representation expense and numerous algorithms have been proposed to promote the rate-distortion performance. More recently, with the unprecedented success of artificial intelligence in various applications, the information preservation of the analysis feature has been playing fundamental roles in visual data compression, which is extracted from image/video for analysis and understanding. Consequently, the ultimate consumer of the compressed visual data is the machine analysis systems.

Analogously, abundant compact representation algorithms for machine analysis features, which are extracted with specific models, have been proposed to preserve the feature-level information and exclude the analysis unrelated texture-level information for better representation compactness. However, the compact representation algorithms of specific analysis feature are difficult to accommodate with multi-task systems and existing image/video codecs. In order to improve the compression efficiency towards machine vision and accommodate with conventional image/video codecs, the present disclosure proposes the pre-analysis based temporal spatial resampling compression framework to exploit the redundancy in terms of pre-analysis, temporal and spatial domain towards machine.

The development of image/video compression algorithms is coding standard driven. For texture compression, a series of standards have been developed to compress visual data, such as JPEG and JPEG 2000 for still image compression, and H.264/AVC, H.265/HEVC and VVC (Versatile Video Coding) for video data compression. In order to improve the compression performance furthermore, there are numerous algorithms developed for the future video compression standards, including matrix weighted intra prediction, quadtree plus binary, extended coding unit partitioning and mode-dependent non-separable secondary transform. Meanwhile, various optimization algorithms have been proposed in terms of rate-distortion optimization for both texture and feature quality with the encoder optimization. Moreover, with the unprecedented development of visual data understanding, there are tremendous challenges to manage thousands of visual data bitstreams compactly and transmit them simultaneously for further analysis, such as smart cities and Internet of Video Things (IoVT). Furthermore, the analysis performance may be influenced dramatically due to the quality degradation of the feature in the human vision quality oriented compression. To tackle this problem, the standards for compact visual feature representation have also been developed by Moving Picture Experts Group (MPEG) to reduce the representation data size of analysis feature, which could facilitate various intelligent tasks with front-end intelligence. Specifically, the standards of Compact Descriptors for Visual Search (CDVS) and Compact Descriptors for Video Analysis (CDVA) have been finalized, targeting at achieving very compact descriptors for visual data. Moreover, the standardization of video coding for machine has also been launched, in effort to figure a complete picture of the compact representation of visual data in terms of the machine vision.

Moreover, deep learning can be used in various applications, especially in visual data representation and understanding domain. In particular, deep neural network based end-to-end compression frameworks can be used. A recurrent neural network (RNN) can be applied to the end-to-end learned image representation, to achieve a comparable performance compared with JPEG. Motivated by the block based transform in traditional image/video compression, a convolutional neural network (CNN) based end-to-end image compression model can be combined with the discrete cosine transform (DCT) to achieve a comparable performance compared with JPEG at low bitrate.

Nonlinear transformation is one of the properties of neural networks that are consistent with the human visual system (HVS). To optimize the end-to-end nonlinear transform codec for perceptual quality, a generalized divisive normalization (GDN) can be used. On the basis of this, a density estimation model can be combined with a cascade of GDNs, to surpass the compression performance of JPEG 2000. The redundancy of the latent code in end-to-end image compression can be further eliminated under an entropy penalization constraint with weight reparameterization, which is implemented with a variational hyper-prior model. In order to further exploit the correlation of the latent representation, an autoregressive model can be used to achieve a superior rate-distortion performance comparing with the current state-of-the-art image codec, BPG, in terms of both PSNR and MS-SSIM distortion metrics. To further improve the accuracy of the entropy models for the rate estimation, a discretized Gaussian Mixture Likelihoods can be used to parameterize the distributions of the latent representations, which could formulate a more accurate and flexible entropy model, and achieve a comparable performance with the latest compression standard VVC regarding bitrate-PSNR performance.

Generally, for systems using pre-analysis of visual data compression for human vision, conventional visual data compression is performed by representing the local and low-level information compactly in a patch-wise manner. However, this could limit the compact representation capability, since the high-level information is not fully utilized. To tackle this problem, pre-analysis can be used to improve the representation performance as it can extract global and high-level information of visual data. Specifically, a visual attention based pre-analysis model can be used to optimize the coding parameter settings for better compression performance. Moreover, pre-analysis can also be applied to the rate control for real-time video coding. From the perspective of coding complexity simplification, pre-analysis can also be applied to the acceleration of the integer motion estimation in JEM.

There is abundant temporal domain redundancy of video data and various algorithms can be used to exploit the temporal redundancy of video compression for better representation efficiency towards human vision. Specifically, a segmentation-based video compression framework can be used by sending the parameter of the skipped parts as side information to improve the compression performance. Moreover, motivated by the powerful information representation ability of deep learning, CNN-based models can be combined with temporal resampling and applied to video compression for better signal coding performance.

Moreover, the spatial domain redundancy may also exist in image/video data. Various algorithms can be used to exploit the spatial redundancy. Specifically, a down-sampling based paradigm can be used to improve image compression performance at low bitrates. A local random convolution kernel can be used to preserve the high frequency information at low bitrate compression. To utilize deep learning, a convolutional neural network based end-to-end image compression framework can be used to achieve performance improvement, compared with several existing coding standards.

In recent years, there have been numerous developments of the visual data compression. With the progresses of various machine analysis tasks, some analysis feature compression algorithms are also proposed to improve the visual data compression efficiency towards machine vision and accommodate with the rapid development of machine analysis applications. However, the existing visual data codecs mainly focus on the signal fidelity and human vision quality, not machine vision. Moreover, the image/video compression framework, which is composed of the pre-analysis, temporal and spatial resampling towards machine vision, has not been investigated.

The present disclosure provides compression methods that are more suitable for machine vision tasks. As described below in detail, the disclosed methods perform pre-analysis based temporal spatial resampling compression towards machine vision.

Figure 5:
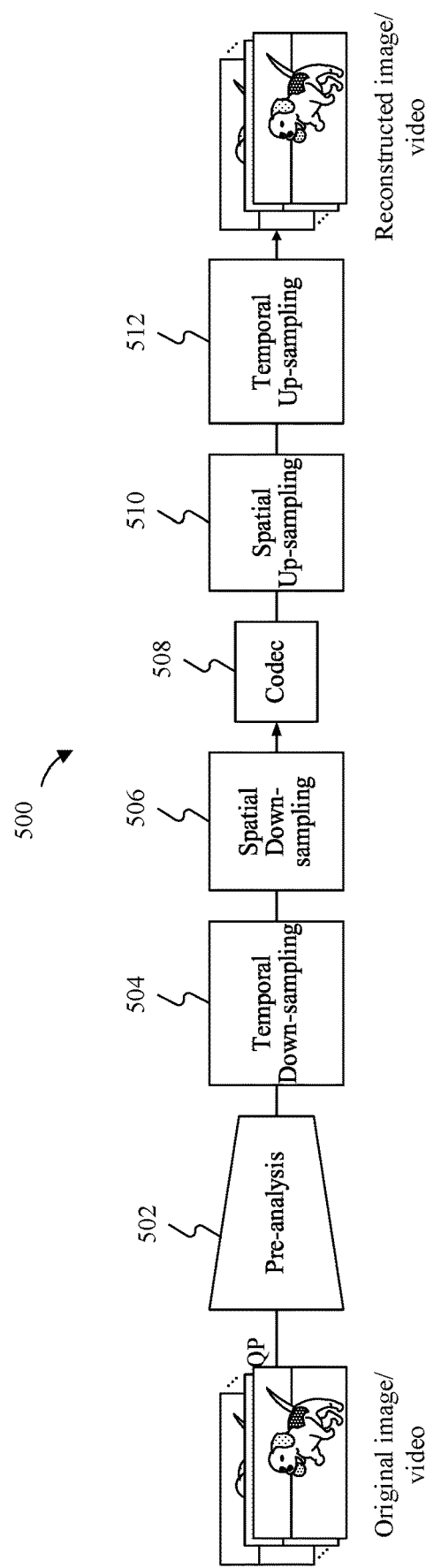
FIG. 5 is a schematic diagram illustrating an exemplary framework for performing pre-analysis based temporal spatial resampling compression towards machine vision, according to some embodiments of the present disclosure.

FIG. 5 is a schematic diagram illustrating an overall framework 500 of the pre-analysis based temporal spatial resampling compression for machine vision, according to some embodiments consistent with the present disclosure. As shown in FIG. 5, the input of the framework 500 is an original image/video data and a quantization parameter (QP) for compression. Referring to FIG. 5, framework 500 includes pre-analysis 502 to extract the critical regions (e.g., bounding box) of the original image/video before performing resampling. For example, an instance segmentation model can be applied for pre-analysis 502. An output of pre-analysis 502 may include various segment mask of multiple instances for machine vision. For example, a merged segment mask, a merged segment mask with around regions, a merged segment mask with predicted instance region, etc. The output of pre-analysis 502 may also include objects. Then, resampling and compression can be performed on the output of pre-analysis 502. A resampling includes a down-sampling and an up-sampling. The down-sampling refers to a process of reducing the number of samples in a signal, and the up-sampling refers to a process of increasing the number of samples in a signal. In some embodiments, the resampling may include a temporal resampling and a spatial resampling. In some embodiments, at least one of temporal resampling or spatial resampling is performed. For example, before compression (e.g., codec 508), a temporal down-sampling 504 and a spatial down-sampling 506 are performed. Accordingly, after compression (e.g., codec 508), a temporal up-sampling 510 and a spatial down-sampling 512 are performed. On the basis of the output of pre-analysis 502, temporal down-sampling 504 is used to reduce the temporal redundancy of input data (i.e., the output of pre-analysis 502), and spatial down-sampling 506 is used to reduce the spatial redundancy of the input data. Then, the down-sampled data (e.g., the original image/video data down-sampled by temporal down-sampling 504 and spatial down-sampling 506) is fed into a codec 508 for compression with the QP. Codec 508 may perform encoding or decoding according to an image/video standard, such as such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc.

Then, the reconstructed image data output from codec 508 is further recovered with spatial up-sampling 510 and temporal up-sampling 512 to obtain the ultimate reconstructed image/video (i.e., the output of framework 500). It is noted that, in some embodiments, for VCM, the parameters (e.g., resampling control information) for resampling can be known for both encoding and decoding side. In some embodiments, spatial down-sampling 506 can be performed before temporal down-sampling 504, and accordingly, spatial up-sampling 510 is performed after temporal up-sampling 512. In some embodiments, the up-samplings (e.g., spatial up-sampling 510 and temporal up-sampling 512) can be skipped and the reconstructed image data output from codec 508 can be directly used by the machine vision tasks.

With framework 500, temporal resampling and spatial resampling can be performed with the compression for machine vision, thereby improving the data process performance for machine vison.

Figure 6:
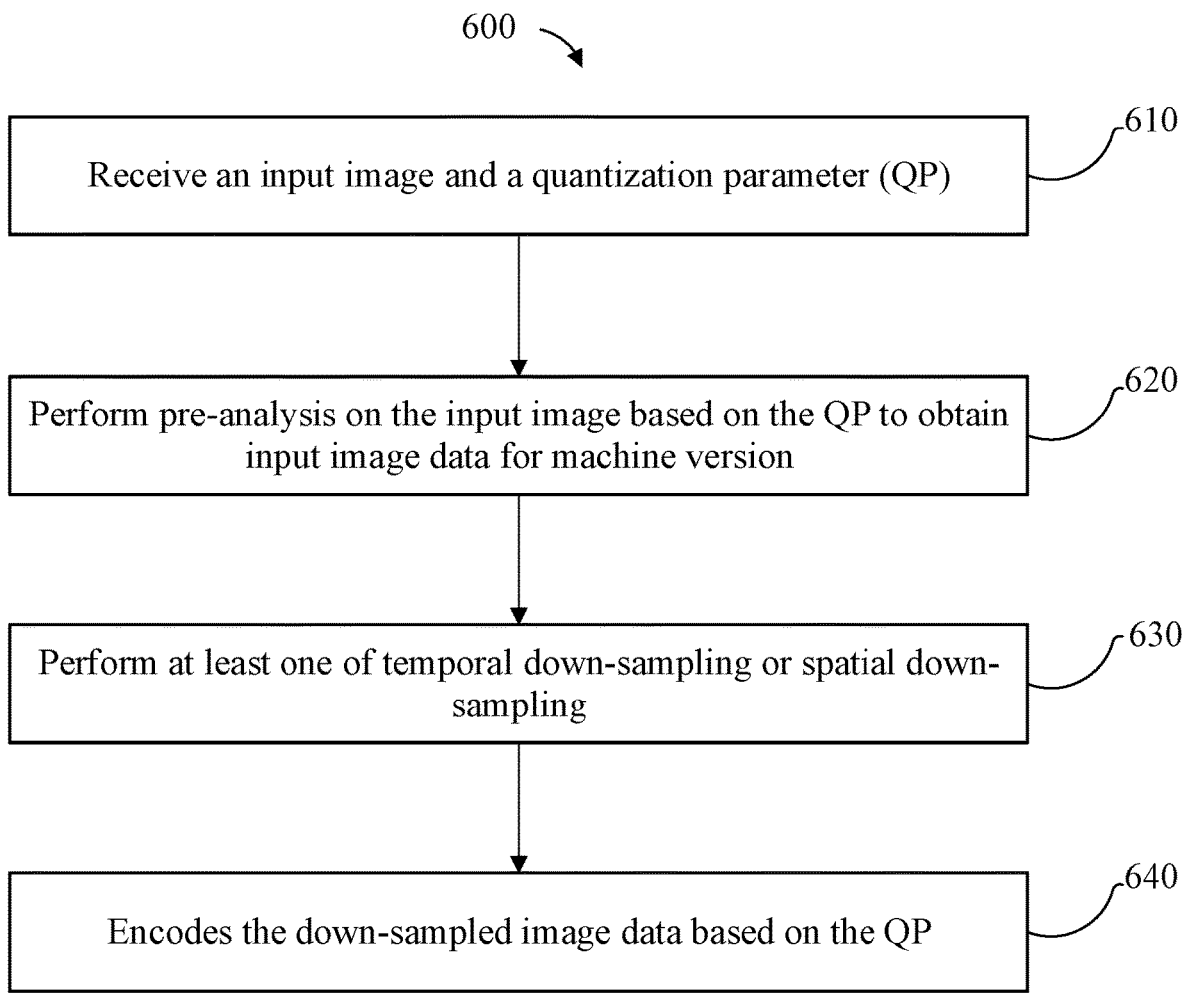
FIG. 6 is a flowchart of an exemplary image data encoding method, according to some embodiments of the present disclosure.

FIG. 6 is a flowchart of an exemplary image data encoding method 600, according to some embodiments of the present disclosure. For example, method 600 may be performed by a system having one or more processors, such as image/video preprocessor 122 (FIG. 1) or image/video encoder 124 (FIG. 1). As shown in FIG. 6, method 600 includes the following steps 610 to 640.

At step 610, the system receives an input image and a quantization parameter (QP). The quantization parameter (QP) is used by a codec to determine the amount of quantization (and inverse quantization) applied to the prediction residuals.

At step 620, the system performs pre-analysis on the input image based on the QP to obtain input image data for machine version. In some embodiments, the system may execute an instance segmentation algorithm to partition an input picture into multiple segments, e.g., sets of pixels each of which representing a portion of the input image. The instance segmentation algorithm may assign a label (i.e., category) to each set of pixels, such that pixels with the same label share certain common characteristics. The system may then group the pixels according to their labels and designate each group as a distinct object. On the basis of the labels, the system may determine the boundary of each object (e.g., segment mask). Moreover, the system may determine a background of the input image to be the portion of the image other than the objects.

At step 630, the system performs at least one of temporal down-sampling or spatial down-sampling. In some embodiments, the temporal down-sampling is performed based on temporal redundancy, and the spatial down-sampling is performed based on spatial redundancy. The temporal redundancy and spatial redundancy can be obtained at step 620 during pre-analysis.

In some embodiments, the system may determine the temporal redundancy by analyzing motion information in a sequence of input images. For example, the processor may track the change of each object across different pictures. In some embodiments, the temporal redundancy can be determined based on a combination of the motion information and the QP.

In some embodiments, the system may determine the spatial redundancy according to the QP. Larger QP means larger quantization loss and lower bits. For example, when the QP is smaller, then the spatial redundancy is higher. And when the QP is larger, then the spatial redundancy is lower.

In some embodiments, the system may determine the spatial redundancy by comparing an area of objects with a whole area of the input image.

In some embodiments, when the temporal down-sampling is performed, a first flag is signaled to indicate the performance of the temporal down-sampling. When the spatial down-sampling is performed, a second flag is signaled to indicate the performance of the spatial down-sampling, and an index indicating a resampling factor is further signaled. The resampling factor may include 100%, 75%, 50%, 25%, and etc.

In some embodiment, the first flag is signaled with different values, for example, 1 or 0, indicating whether the temporal down-sampling has been performed (or in the process of being performed) or not. The second flag is signaled with different values, for example, 1 or 0, indicating whether the spatial down-sampling has been performed (or in the process of being performed) or not.

In some embodiments, resampling control information (e.g., the signal decimation parameter or down-sampling step size) associated with the at least one of temporal down-sampling or spatial down-sampling can be generated.

At step 640, the system encodes the down-sampled image data based on the QP. The system may encode the down-sampled image data according to any suitable coding standard, such as VVC. In some embodiments, in addition to encoding the down-sampled image data, the system may also encode the resampling control information (e.g., the signal decimation parameter or down-sampling step size) in a bitstream. In some embodiments, the down-sampled image data and the resampling control information may be encoded in the same bitstream or in different bitstreams.

In some embodiments, considering the diversity of the image/video, the adaptivity of the proposed framework 500 is further exploited in terms of the temporal and spatial resample with pre-analysis. To improve the compression efficiency further, the temporal and spatial adaptivity could also be combined.

According to some embodiments, adaptive temporal resampling may be implemented. Since the temporal complexity of video is diverse, the adaptivity of the temporal resampling for various visual data content is provided.

Figure 7:
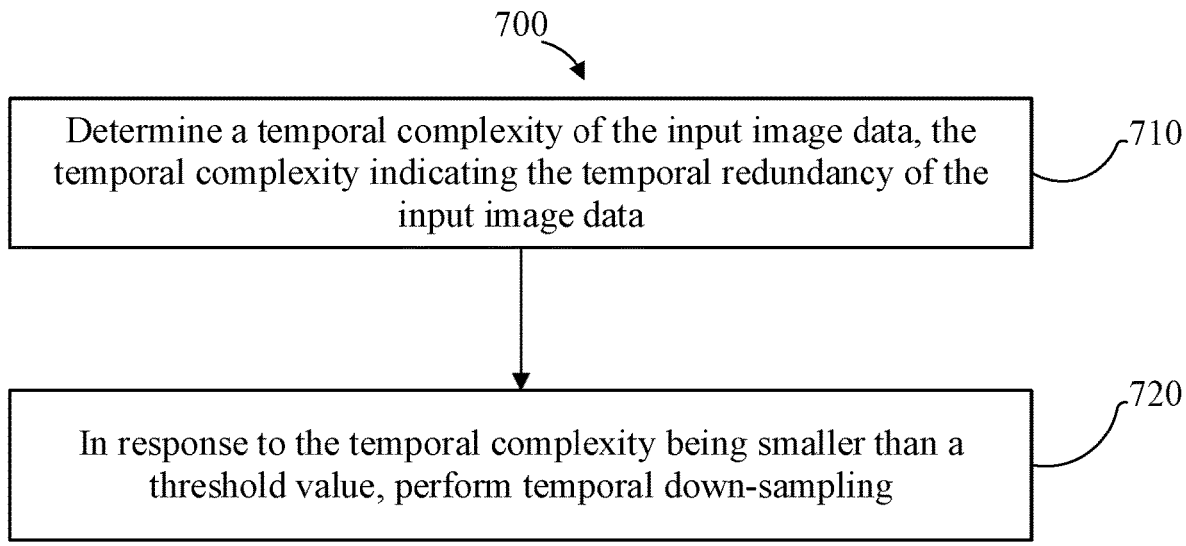
FIG. 7 is a flowchart illustrating sub-steps for an exemplary encoding method, according to some embodiments of the present disclosure.

FIG. 7 is a flowchart illustrating sub-steps for an exemplary encoding method 700, according to some embodiments of the present disclosure. For example, method 700 may be performed by a system having one or more processors, such as image/video preprocessor 122 (FIG. 1) or image/video encoder 124 (FIG. 1). As shown in FIG. 7, step 630 of method 600 may further include the following steps 710 and 720.

At step 710, the system determines a temporal complexity of the input image data. The temporal complexity indicates the temporal redundancy of the input image data. In some embodiments, a temporal complexity $t_c$ is calculated based on the output of pre-analysis 502 shown in FIG. 5. For example, the temporal complexity $t_c$ can be obtained based on an averaged mean absolute difference (MAD) for every testing point and an interval of the sequence of input image, for example, a testing point is the $i^{th}$ frame for a video sequence, and the testing points are sampled across the video sequence equally with an interval d. If the motion is slow or the temporal change among the video sequence is small, the system may determine the temporal redundancy is high, and the temporal complexity t c is low. If the motion is fast or the temporal change among the video sequence is great, the system may determine the temporal redundancy is low, and the temporal complexity t c is high.

At step 720, in response to the temporal complexity being smaller than a threshold value, the system performs temporal down-sampling. If t c is smaller than a threshold of temporal complexity $t_{c,thres}$, then the temporal complexity is lower, and the temporal down-sampling can be performed to reduce the temporal redundancy. If t c is greater than or equal to the threshold of temporal complexity $t_{c,thres}$, the temporal down-sampling can be skipped. The threshold of temporal complexity $t_{c,thres}$ can be set in a range of 2 to 6.

In some embodiments, the temporal redundancy of the input image data can be determined according to a combination of the temporal complexity and the QP.

According to some embodiments, adaptive spatial resampling may be implemented. In particular, considering obvious content diversity of the images and the frames in videos, not all the image/video should be processed with the spatial resampling.

Figure 8:
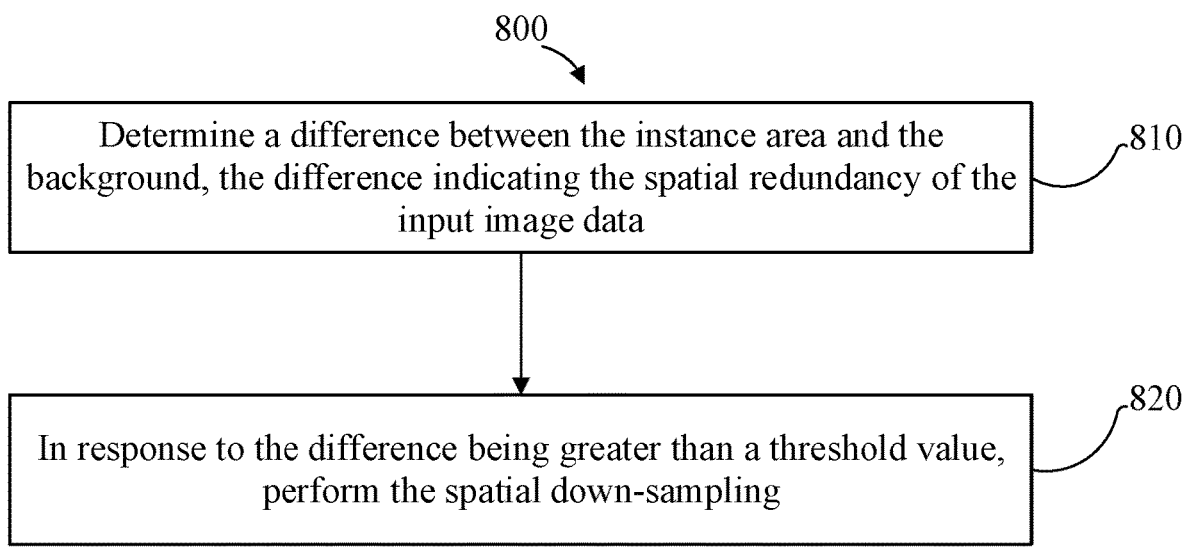
FIG. 8 is a flowchart illustrating sub-steps for another exemplary encoding method, according to some embodiments of the present disclosure.

FIG. 8 is a flowchart illustrating sub-steps for an exemplary encoding method 800, according to some embodiments of the present disclosure. For example, method 800 may be performed by a system having one or more processors, such as image/video preprocessor 122 (FIG. 1) or image/video encoder 124 (FIG. 1). As shown in FIG. 8, step 630 of method 600 may further include the following steps 810 and 820.

At step 810, the system determines a difference between the instance area and the background. The difference indicates the spatial redundancy of the input image data.

In some embodiments, the difference can be determined according to the QP. A larger QP means larger quantization loss and lower bits. For example, when the QP is larger, the background lacks details, the system may determine the background has a lower degree of redundancy. When the QP is smaller, the background includes more details, the system may determine the background has a higher degree of redundancy.

In some embodiments, the difference can be defined by a portion parameter based on an area of objects and an area of the input image. The portion parameter indicates the spatial redundancy of the input image. For example, portion parameter p can be obtained by: p=an area of objects/an area of input image. When portion parameter p is smaller, that means the objects occupies a smaller portion of input image and a discrimination of the instance is higher. When portion parameter p is larger, that means the objects occupies a greater portion of input image and the discrimination of the instance is smaller, then the spatial down-sampling can be skipped.

At step 820, in response to the difference being greater than a threshold value, the system performs the spatial down-sampling. In some embodiments, if the QP for encoding is smaller than a threshold value a, then the spatial redundancy is higher and the spatial down-sampling can be performed to reduce the spatial redundancy. If the QP for encoding is greater than or equal to the threshold value a, then the spatial redundancy is lower and the spatial down-sampling can be skipped.

In some embodiments, in response to the portion parameter p being greater than a threshold value $p_{thres}$, the system performs spatial down-sampling. If portion parameter p is greater than the threshold of spatial resampling $p_{thres}$, then the spatial redundancy is higher and the spatial down-sampling can be performed to reduce the spatial redundancy. If portion parameter p is smaller than or equal to the threshold of spatial resampling $p_{thres}$, then the spatial redundancy is lower, and the spatial down-sampling can be skipped. In some embodiments, the threshold of spatial resampling $p_{thres}$ can be set in a range of 0.3 to 0.6.

In some embodiments, a set of resampling factors (for example, 50%, 75%, etc.) can be further defined according to the portion parameter p. An index indicating the resampling factor can be signaled. For example, different value of the index may indicate different resampling factors.

Figure 9:
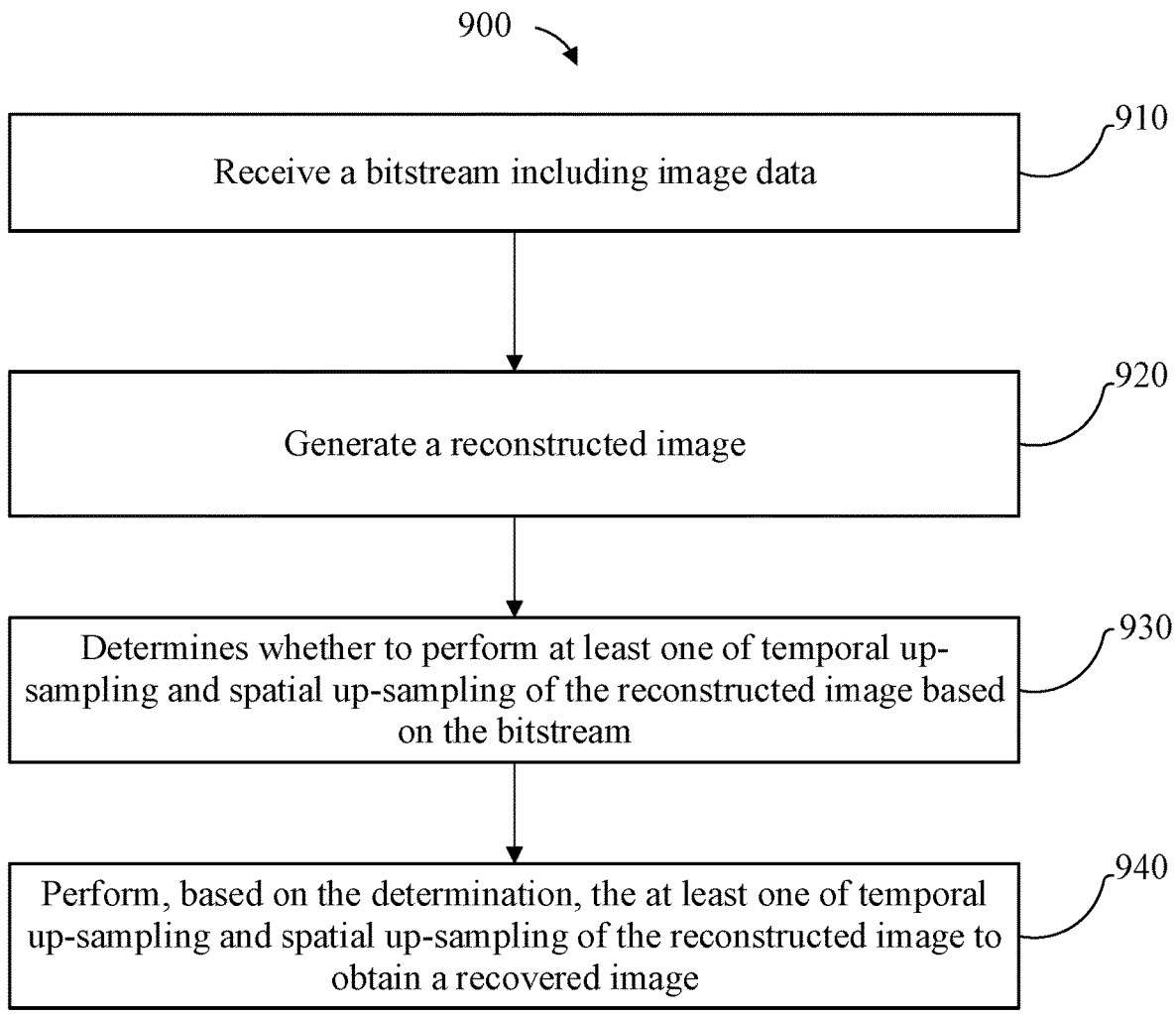
FIG. 9 is a flowchart of an exemplary image data decoding method, according to some embodiments of the present disclosure.

FIG. 9 is a flowchart of an exemplary image data decoding method 900, according to some embodiments of the present disclosure. For example, method 900 may be performed by a system having one or more processors, such as image/video decoder 144 in FIG. 1. As shown in FIG. 9, method 900 includes the following steps 910 to 930.

At step 910, the system receives a bitstream including image data.

At step 920, the system generates a reconstructed image. The system may decode the bitstream and reconstruct a decoded picture according to any suitable coding standard, such as VVC.

At step 930, the system determines whether to perform at least one of temporal up-sampling or spatial up-sampling of the reconstructed image based on the bitstream. In some embodiments, the system may decode flags indicating whether temporal down-sampling or spatial down-sampling has been or in the process of being performed from the bitstream, and determine whether to perform at least one of temporal up-sampling or spatial up-sampling based on the flags. For example, when the system determines that a first flag indicating that the temporal down-sampling has been or in the process of being performed on an input image exists in the bitstream, the temporal up-sampling is determined to be performed on the reconstructed image. In some embodiments, when the system determines that a second flag indicating that the spatial down-sampling has been or in the process of being performed on an input image exists in the bitstream, the spatial up-sampling is determined to be performed on the reconstructed image. The up-samplings are determined to be performed on the decoder side when the corresponding down-samplings are performed on the encoder side.

In some embodiments, when the system determines a value (e.g., 1) of the first flag indicating that the temporal down-sampling has been performed on the input image in the bitstream, the temporal up-sampling is determined to be performed on the reconstructed image. In some embodiments, when the system determines a value (e.g., 1) of a second flag indicating the spatial down-sampling has been performed on the input image, the spatial up-sampling is determined to be performed on the reconstructed image.

At step 940, the system performs, based on the determination, the at least one of temporal up-sampling or spatial up-sampling of the reconstructed image to obtain a recovered image. In some embodiments, the at least one of temporal up-sampling or spatial up-sampling is performed based on the quantization parameter (QP) and at least one of a temporal redundancy or a spatial redundancy associated with the reconstructed image. In some embodiments, an index indicating a resampling factor can be decoded from the bitstream when the second flag exists or the value of the second flag indicating the spatial down-sampling is performed on the input image. The spatial up-sampling can be performed based on the resampling factor.

In some embodiments, the resampling control information is signaled in the bitstream. Specifically, at the encoder side, the resampling control information used for the temporal down-sampling or spatial down-sampling (e.g., signal decimation parameter or down-sampling step size) may be encoded and signaled in the bitstream. Accordingly, at the decoder side, the system may decode the resampling control information and perform the up-sampling based on the resampling control information. The up-sampling is a reverse of the down-sampling.

In some embodiments, resampling control information associated with the up-sampling is not signaled in the bitstream. In particular, since transmitting the control information requires additional bits, it may be not feasible to transmit the resampling control information in low bitrate situations. In some embodiments, at the decoder side, the system is required to find the resampling control information (e.g., interpolation step size) based on the decoded image data. For example, for a fully controlled system, the resampling control information can be prestored in the decoder.

In some embodiments, the temporal up-sampling and the spatial up-sampling can be skipped on the decoder side.

It is appreciated that an embodiment of the present disclosure can be combined with another embodiments or some other embodiments.

In some embodiments, a non-transitory computer-readable storage medium storing one or more bitstreams processed according to the above-described methods is also provided. For example, the one or more bitstreams may be encoded according to methods 600, 700, 800 (FIGS. 6 to 8) and decoded according to method 900 (FIG. 9).

The embodiments may further be described using the following clauses:

1. An image data encoding method, comprising:
   receiving an input image and a quantization parameter (QP);
   performing pre-analysis of the input image based on the QP to obtain input image data for machine version;
   determining at least one of a temporal redundancy or a spatial redundancy of the input image data;
   determining, based on the at least one of temporal redundancy or spatial redundancy, whether to perform at least one of temporal down-sampling or spatial down-sampling;
   performing down-sampling of the input image data according to the determination, wherein the down-sampling includes at least one of temporal down-sampling or spatial down-sampling; and
   encoding the down-sampled image data based on the QP.

2. The method according to clause 1, wherein determining at least one of a temporal redundancy or a spatial redundancy of the input image data comprises:
   determining a temporal complexity of the input image data, the temporal complexity indicating the temporal redundancy of the input image data; and
   wherein determining, based on the at least one of temporal redundancy or spatial redundancy, whether to perform at least one of temporal down-sampling or spatial down-sampling comprises:
   in response to the temporal complexity being smaller than a threshold value, performing temporal down-sampling.

3. The method according to clause 1, wherein performing pre-analysis of the input image based on the QP to obtain input image data for machine version further comprises:
   performing instance segmentation of the input image, to determine an instance area and a background of the input image.

4. The method according to clause 3, wherein determining at least one of a temporal redundancy or a spatial redundancy of the input image data comprises:
   determining a difference between the instance area and the background, the difference indicating the spatial redundancy of the input image data; and
   determining, based on the at least one of temporal redundancy or spatial redundancy, whether to perform at least one of temporal down-sampling or spatial down-sampling of the input image data comprises:
   in response to the difference being greater than a threshold value, performing the spatial down-sampling.

5. The method according to clause 4, wherein determining the difference between the instance area and the background, the difference indicating the spatial redundancy of the input image data further comprises:
   determining a portion parameter; and
   in response to the difference being greater than a threshold value, performing the spatial down-sampling, further comprises:
   in response to the portion parameter being greater than a threshold value, performing the spatial down-sampling;
   wherein the portion parameter is obtained by dividing an area of the input image by an area of objects.

6. The method according to clause 1, further comprising:
   in response to performing the temporal down-sampling, signaling a first flag indicating temporal down-sampling is performed.

7. The method according to clause 1, further comprising:
   in response to performing the spatial down-sampling, signaling a second flag indicating spatial down-sampling is performed and an index indicating a resampling factor.

8. The method according to clause 1, further comprising:
   generating resampling control information associated with the at least one of temporal down-sampling or spatial down-sampling; and encoding the resampling control information in a bitstream.

9. An image data decoding method, comprising:
   receiving a bitstream comprising image data;
   generating reconstructed image;
   determining whether to perform at least one of temporal up-sampling or spatial up-sampling of the reconstructed image based on the bitstream; and performing, based on the determination, the at least one of temporal up-sampling or spatial up-sampling to obtain a recovered image.

10. The method according to clause 9, wherein determining whether to perform at least one of temporal up-sampling or spatial up-sampling on the reconstructed image based on the bitstream further comprises:
    performing the temporal up-sampling when a first flag indicating temporal down-sampling has been performed exists in the bitstream; and
    performing the spatial up-sampling when a second flag indicating spatial down-sampling has been performed exists in the bitstream.

11. The method according to clause 10, wherein performing the spatial up-sampling when a second flag indicating spatial down-sampling has been performed exists in the bitstream further comprises:
    decoding an index indicating a resampling factor; and
    performing the spatial up-sampling based on the resampling factor.

12. The method according to clause 9, further comprising:
   decoding resampling control information associated with the at least one of temporal down-sampling or spatial down-sampling; and
   performing the at least one of temporal down-sampling or spatial down-sampling based on the resampling control information.
   determining a temporal complexity of the reconstructed image; and
   in response to the temporal complexity being smaller than a threshold value, performing temporal up-sampling of the reconstructed image.

13. A non-transitory computer readable storage medium storing a bitstream generated by operations comprising:
   receiving an input image and a quantization parameter (QP);
   performing pre-analysis on the input image based on the QP to obtain input image data for machine version;
   determining at least one of a temporal redundancy or a spatial redundancy of the input image data;
   determining, based on the at least one of temporal redundancy or spatial redundancy, whether to perform at least one of temporal down-sampling or spatial down-sampling;
   performing down-sampling of the input image data according to the determination, wherein the down-sampling includes at least one of temporal down-sampling or spatial down-sampling; and
   encoding the down-sampled image data based on the QP.

14. The non-transitory computer readable storage medium according to clause 13, wherein determining at least one of a temporal redundancy or a spatial redundancy of the input image data comprises:
   determining a temporal complexity of the input image data, the temporal complexity indicating the temporal redundancy of the input image data; and
   determining, based on the at least one of temporal redundancy or spatial redundancy, whether to perform at least one of temporal down-sampling or spatial down-sampling comprises:
   in response to the temporal complexity being smaller than a threshold value, performing temporal down-sampling.

15. The non-transitory computer readable storage medium according to clause 13, wherein performing pre-analysis on the input image based on the QP to obtain input image data for machine version further comprises:
   performing instance segmentation of the input image, to determine an instance area and a background of the input image.

16. The non-transitory computer readable storage medium according to clause 15, wherein determining at least one of a temporal redundancy or a spatial redundancy of the input image data comprises:
   determining a difference between the instance area and the background, the difference indicating the spatial redundancy of the input image data; and
   determining, based on the at least one of temporal redundancy or spatial redundancy, whether to perform at least one of temporal down-sampling or spatial down-sampling of the input image data comprises:
   in response to the difference being greater than a threshold value, performing the spatial down-sampling.

17. The non-transitory computer readable storage medium according to clause 16, wherein determining the difference between the instance area and the background, the difference indicating the spatial redundancy of the input image data further comprises:
   determining a portion parameter; and
   in response to the difference being greater than a threshold value, performing the spatial down-sampling, further comprises:
   in response to the portion parameter being greater than a threshold value, performing the spatial down-sampling; wherein the portion parameter is obtained by dividing an area of the input image by an area of objects.

18. The non-transitory computer readable storage medium according to clause 13, wherein the operations further comprise:
   in response to performing the temporal down-sampling, signaling a first flag indicating performance of temporal down-sampling.

19. The non-transitory computer readable storage medium according to clause 13, wherein the operations further comprise:
   in response to performing the spatial down-sampling, signaling a second flag indicating performance of spatial down-sampling and an index indicating a resampling factor.

20. The non-transitory computer readable storage medium according to clause 13, wherein the operations further comprise:
   generating resampling control information associated with the at least one of temporal down-sampling or spatial down-sampling; and
   encoding the resampling control information in the bitstream.

21. A system comprising: one or more processors configured to execute instructions to cause the system to perform operations comprising:
   receiving an input image and a quantization parameter (QP);
   performing pre-analysis of the input image based on the QP to obtain input image data for machine version;
   determining at least one of a temporal redundancy or a spatial redundancy of the input image data;
   determining, based on the at least one of temporal redundancy or spatial redundancy, whether to perform at least one of temporal down-sampling or spatial down-sampling;
   performing down-sampling of the input image data according to the determination, wherein the down-sampling includes at least one of temporal down-sampling or spatial down-sampling; and
   encoding the down-sampled image data based on the QP.

22. The system according to clause 21, wherein determining at least one of a temporal redundancy or a spatial redundancy of the input image data comprises:
   determining a temporal complexity of the input image data, the temporal complexity indicating the temporal redundancy of the input image data; and
   wherein determining, based on the at least one of temporal redundancy or spatial redundancy, whether to perform at least one of temporal down-sampling or spatial down-sampling comprises:
   in response to the temporal complexity being smaller than a threshold value, performing temporal down-sampling.

23. The system according to clause 21, wherein performing pre-analysis of the input image based on the QP to obtain input image data for machine version further comprises:

performing instance segmentation of the input image, to determine an instance area and a background of the input image.

24. The system according to clause 23, wherein determining at least one of a temporal redundancy or a spatial redundancy of the input image data comprises:
　determining a difference between the instance area and the background, the difference indicating the spatial redundancy of the input image data; and
　determining, based on the at least one of temporal redundancy or spatial redundancy, whether to perform at least one of temporal down-sampling or spatial down-sampling of the input image data comprises:
　　in response to the difference being greater than a threshold value, performing the spatial down-sampling.

25. The system according to clause 24, wherein determining the difference between the instance area and the background, the difference indicating the spatial redundancy of the input image data further comprises:
　determining a portion parameter; and
　in response to the difference being greater than a threshold value, performing the spatial down-sampling, further comprises:
　　in response to the portion parameter being greater than a threshold value, performing the spatial down-sampling; wherein the portion parameter is obtained by dividing an area of the input image by an area of objects.

26. The system according to clause 21, wherein the operations further comprise:
　in response to performing the temporal down-sampling, signaling a first flag indicating temporal down-sampling is performed.

27. The system according to clause 21, wherein the operations further comprise:
　in response to performing the spatial down-sampling, signaling a second flag indicating spatial down-sampling is performed and an index indicating a resampling factor.

28. The system according to clause 21, wherein the operations further comprise:
　generating resampling control information associated with the at least one of temporal down-sampling or spatial down-sampling; and
　encoding the resampling control information in a bitstream.

29. A system comprising: one or more processors configured to execute instructions to cause the system to perform operations comprising:
　receiving a bitstream comprising image data;
　generating reconstructed image;
　determining whether to perform at least one of temporal up-sampling or spatial up-sampling of the reconstructed image based on the bitstream; and
　performing, based on the determination, the at least one of temporal up-sampling or spatial up-sampling to obtain a recovered image.

30. The system according to clause 29, wherein determining whether to perform at least one of temporal up-sampling or spatial up-sampling on the reconstructed image based on the bitstream further comprises:
　performing the temporal up-sampling when a first flag indicating temporal down-sampling has been performed exists in the bitstream; and
　performing the spatial up-sampling when a second flag indicating spatial down-sampling has been performed exists in the bitstream.

31. The system according to clause 30, wherein performing the spatial up-sampling when a second flag indicating spatial down-sampling has been performed exists in the bitstream further comprises:
　decoding an index indicating a resampling factor; and
　performing the spatial up-sampling based on the resampling factor.

32. The system according to clause 29, wherein the operations further comprise:
　decoding resampling control information associated with the at least one of temporal down-sampling or spatial down-sampling; and
　performing the at least one of temporal down-sampling or spatial down-sampling based on the resampling control information.
　determining a temporal complexity of the reconstructed image; and
　in response to the temporal complexity being smaller than a threshold value, performing temporal up-sampling of the reconstructed image.

In some embodiments, a non-transitory computer-readable storage medium is also provided. In some embodiments, the medium can store all or portions of the video bitstream having one or more flags that indicate resampling applied, such as the temporal resampling and the spatial resampling. In some embodiments, the medium can store all or portions of the video bitstream having an index that indicates a resampling factor. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An image data encoding method, comprising:
receiving an input image and a quantization parameter (QP);
performing pre-analysis of the input image based on the QP to obtain a pre-analyzed input image for machine vision;
determining at least one of a temporal redundancy or a spatial redundancy of the pre-analyzed input image;
determining, based on the at least one of temporal redundancy or spatial redundancy, whether to perform at least one of temporal down-sampling or spatial down-sampling;
performing down-sampling on the pre-analyzed input image according to the determination, wherein the down-sampling includes at least one of temporal down-sampling or spatial down-sampling, and performing down-sampling on the pre-analyzed input image according to the determination further comprises:
performing temporal down-sampling based on the determination of temporal redundancy; or
performing spatial down-sampling based on the determination of spatial redundancy; and
encoding the down-sampled image based on the QP.

2. The method according to claim 1, wherein determining at least one of a temporal redundancy or a spatial redundancy of the pre-analyzed input image comprises:
determining a temporal complexity of the pre-analyzed input image, the temporal complexity indicating the temporal redundancy of the pre-analyzed input image; and
wherein performing temporal down-sampling based on the determination of temporal redundancy comprises:
in response to the temporal complexity being smaller than a threshold value, performing the temporal down-sampling.

3. The method according to claim 1, wherein performing pre-analysis of the input image based on the QP to obtain the pre-analyzed input image for machine vision further comprises:
performing instance segmentation of the input image, to determine an instance area and a background of the input image.

4. The method according to claim 3, wherein determining at least one of a temporal redundancy or a spatial redundancy of the pre-analyzed input image comprises:
determining a difference between the instance area and the background, the difference indicating the spatial redundancy of the pre-analyzed input image; and
performing spatial down-sampling based on the determination of spatial redundancy comprises:
in response to the difference being greater than a threshold value, performing the spatial down-sampling.

5. The method according to claim 4, wherein determining the difference between the instance area and the background, the difference indicating the spatial redundancy of the pre-analyzed input image further comprises:
determining a portion parameter; and
in response to the difference being greater than a threshold value, performing the spatial down-sampling, further comprises:
in response to the portion parameter being greater than a threshold value, performing the spatial down-sampling; wherein the portion parameter is obtained by dividing an area of the input image by an area of objects.

6. The method according to claim 1, further comprising:
in response to performing the temporal down-sampling, signaling a first flag indicating temporal down-sampling is performed.

7. The method according to claim 1, further comprising:
in response to performing the spatial down-sampling, signaling a second flag indicating spatial down-sampling is performed and an index indicating a resampling factor.

8. The method according to claim 1, further comprising:
generating resampling control information associated with the at least one of temporal down-sampling or spatial down-sampling; and
encoding the resampling control information in a bitstream.

9. An image data decoding method, comprising:
receiving a bitstream comprising image data, wherein the image data is obtained by encoding a down-sampled image based on a quantization parameter (QP), the down-sampled image is obtained by performing down-sampling on a pre-analyzed input image, and the pre-analyzed input image is obtained by performing pre-analysis of the input image based on the QP;
generating reconstructed image;
determining whether to perform at least one of temporal up-sampling or spatial up-sampling of the reconstructed image based on the bitstream; and
performing, based on the determination, the at least one of temporal up-sampling or spatial up-sampling to obtain a recovered image.

10. The method according to claim 9, wherein determining whether to perform at least one of temporal up-sampling or spatial up-sampling on the reconstructed image based on the bitstream further comprises:

performing the temporal up-sampling when a first flag indicating temporal down-sampling has been performed exists in the bitstream; and performing the spatial up-sampling when a second flag indicating spatial down-sampling has been performed exists in the bitstream.

11. The method according to claim 10, wherein performing the spatial up-sampling when a second flag indicating spatial down-sampling has been performed exists in the bitstream further comprises:

decoding an index indicating a resampling factor; and performing the spatial up-sampling based on the resampling factor.

12. The method according to claim 9, further comprising:

decoding resampling control information associated with the at least one of temporal up-sampling or spatial up-sampling; and performing the at least one of temporal up-sampling or spatial up-sampling based on the resampling control information.

13. A non-transitory computer readable storage medium storing a set of instructions that are executable by one or more processors of a system to cause the system to perform operations for generating a bitstream, the operations comprising:

receiving a video sequence;

encoding one or more pictures of the video sequence by:

receiving an input image and a quantization parameter (QP);

performing pre-analysis on the input image based on the QP to obtain a pre-analyzed input image for machine vision;

determining at least one of a temporal redundancy or a spatial redundancy of the pre-analyzed input image;

determining, based on the at least one of temporal redundancy or spatial redundancy, whether to perform at least one of temporal down-sampling or spatial down-sampling;

performing down-sampling on the pre-analyzed input image according to the determination, wherein the down-sampling includes at least one of temporal down-sampling or spatial down-sampling, and performing down-sampling on the pre-analyzed input image according to the determination further comprises:

performing temporal down-sampling based on the determination of temporal redundancy; or performing spatial down-sampling based on the determination of spatial redundancy; and encoding the down-sampled image based on the QP; and generating a bitstream that is based on the encoding.

14. The non-transitory computer readable storage medium according to claim 13, wherein determining at least one of a temporal redundancy or a spatial redundancy of the pre-analyzed input image comprises:

determining a temporal complexity of the pre-analyzed input image, the temporal complexity indicating the temporal redundancy of the pre-analyzed input image; and performing temporal down-sampling based on the determination of temporal redundancy comprises:

in response to the temporal complexity being smaller than a threshold value, performing the temporal down-sampling.

15. The non-transitory computer readable storage medium according to claim 13, wherein performing pre-analysis on the input image based on the QP to obtain pre-analyzed input image for machine vision further comprises:

performing instance segmentation of the input image, to determine an instance area and a background of the input image.

16. The non-transitory computer readable storage medium according to claim 15, wherein determining at least one of a temporal redundancy or a spatial redundancy of the pre-analyzed input image comprises:

determining a difference between the instance area and the background, the difference indicating the spatial redundancy of the pre-analyzed input image; and performing spatial down-sampling based on the determination of spatial redundancy comprises:

in response to the difference being greater than a threshold value, performing the spatial down-sampling.

17. The non-transitory computer readable storage medium according to claim 16, wherein determining the difference between the instance area and the background, the difference indicating the spatial redundancy of the pre-analyzed input image further comprises:

determining a portion parameter; and in response to the difference being greater than a threshold value, performing the spatial down-sampling, further comprises:

in response to the portion parameter being greater than a threshold value, performing the spatial down-sampling; wherein the portion parameter is obtained by dividing an area of the input image by an area of objects.

18. The non-transitory computer readable storage medium according to claim 13, wherein the operations further comprise:

in response to performing the temporal down-sampling, signaling a first flag indicating performance of temporal down-sampling.

19. The non-transitory computer readable storage medium according to claim 13, wherein the operations further comprise:

in response to performing the spatial down-sampling, signaling a second flag indicating performance of spatial down-sampling and an index indicating a resampling factor.

20. The non-transitory computer readable storage medium according to claim 13, wherein the operations further comprise:

generating resampling control information associated with the at least one of temporal down-sampling or spatial down-sampling; and encoding the resampling control information in the bitstream.

* * * * *